(12) United States Patent
Hart

(10) Patent No.: US 9,360,150 B2
(45) Date of Patent: *Jun. 7, 2016

(54) MODULAR COMBINATION SKID

(71) Applicant: Hart Oilfield Rentals Ltd., Rocky Mountain House (CA)

(72) Inventor: Gordon Hart, Rocky Mountain House (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/462,313

(22) Filed: Aug. 18, 2014

(65) Prior Publication Data

US 2014/0353450 A1 Dec. 4, 2014

Related U.S. Application Data

(63) Continuation of application No. 13/562,321, filed on Jul. 31, 2012.

(30) Foreign Application Priority Data

Jun. 15, 2012 (CA) ..................................... 2779967

(51) Int. Cl.
| | |
|---|---|
| *B65D 19/44* | (2006.01) |
| *F16M 5/00* | (2006.01) |
| *B65D 71/00* | (2006.01) |
| *F16M 3/00* | (2006.01) |

(52) U.S. Cl.
CPC .................. *F16M 5/00* (2013.01); *B65D 19/44* (2013.01); *B65D 71/0092* (2013.01); *F16M 3/00* (2013.01)

(58) Field of Classification Search
CPC ....................................................... B65D 19/44

USPC ............ 108/55.1, 51.11, 55.3, 55.5; 414/788, 414/792.8, 498; 410/46; 206/386
See application file for complete search history.

(56) References Cited

U.S. PATENT DOCUMENTS

| | | | | | |
|---|---|---|---|---|---|
| 2,831,588 | A | * | 4/1958 | Seed .............................. | 414/341 |
| 3,451,573 | A | * | 6/1969 | Josephian ..................... | 414/498 |
| 3,480,174 | A | * | 11/1969 | Sherwood .................... | 108/55.1 |
| 3,916,799 | A | * | 11/1975 | Smith ................................ | 410/1 |
| 4,307,985 | A | * | 12/1981 | Desprez et al. .............. | 108/55.1 |
| 4,834,000 | A | * | 5/1989 | Darnell et al. ............. | 108/57.15 |
| 5,876,164 | A | * | 3/1999 | Hamelin et al. ................ | 410/35 |
| 5,983,806 | A | * | 11/1999 | Brennan et al. .............. | 108/53.1 |
| 7,275,902 | B1 | * | 10/2007 | Klotz .............................. | 410/42 |
| 7,337,926 | B2 | * | 3/2008 | LeRoy ....................... | 222/181.1 |
| 8,425,165 | B2 | * | 4/2013 | Harada et al. .................. | 410/46 |
| 2005/0252423 | A1 | * | 11/2005 | Baker .......................... | 108/55.1 |
| 2008/0250986 | A1 | * | 10/2008 | Boon ........................... | 108/53.1 |

* cited by examiner

*Primary Examiner* — Jose V Chen
(74) *Attorney, Agent, or Firm* — Sander R. Geising

(57) ABSTRACT

A combination skid for supporting a plurality of skid-supported loads comprises a base having a longitudinal axis and a plurality of docking stations, each to receive a skid-supported load along a loading directional axis. The loading directional axis of the plurality of docking stations is oriented substantially perpendicular to the longitudinal axis of the base. In a system aspect, a system for supporting one or more loads is provided. The system comprises a base having a longitudinal axis, at least one skid for supporting the one or more loads and at least one docking station to receive the at least one skid along a loading directional axis. The each of the loading directional axis is oriented substantially perpendicular to the longitudinal axis of the base.

20 Claims, 25 Drawing Sheets

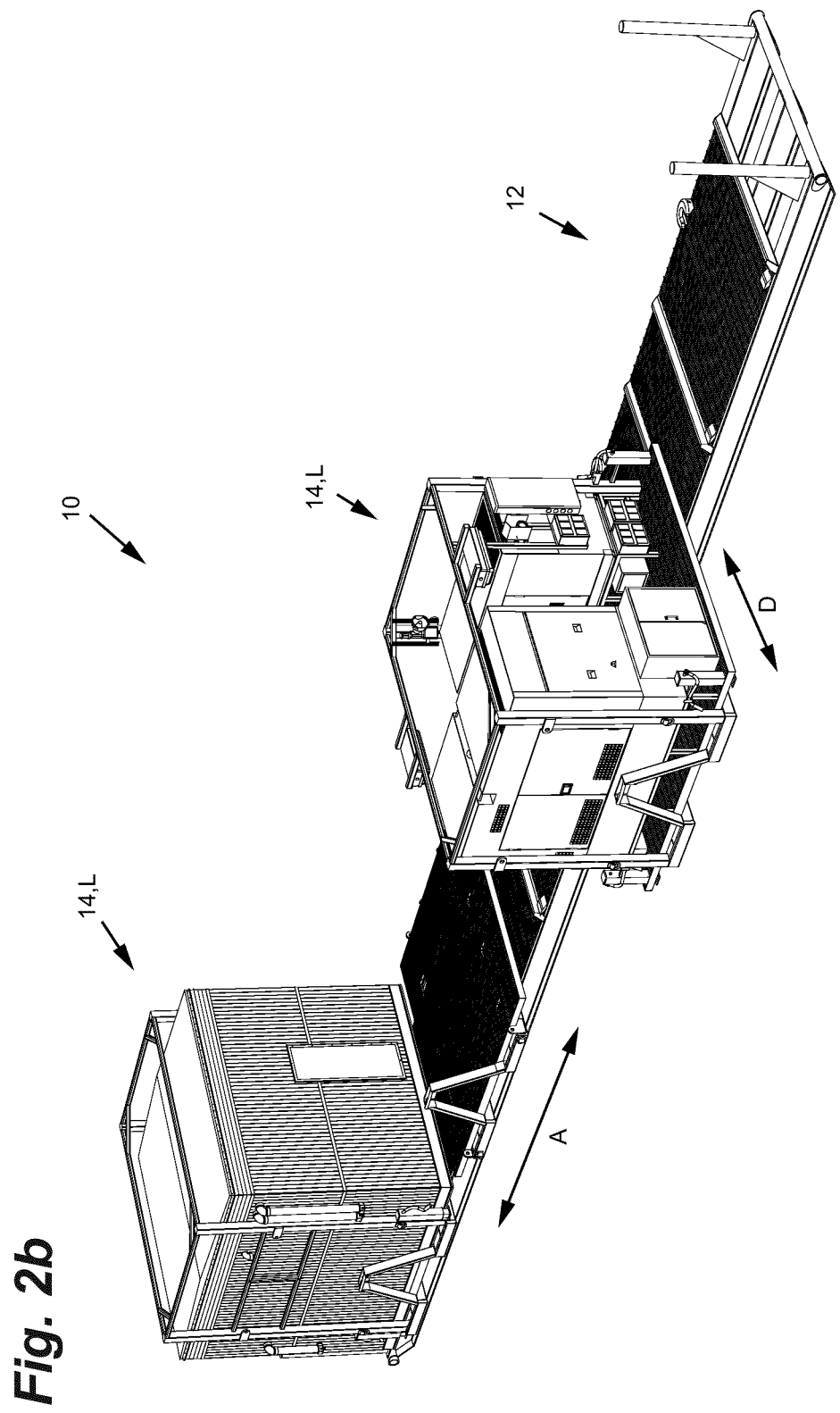

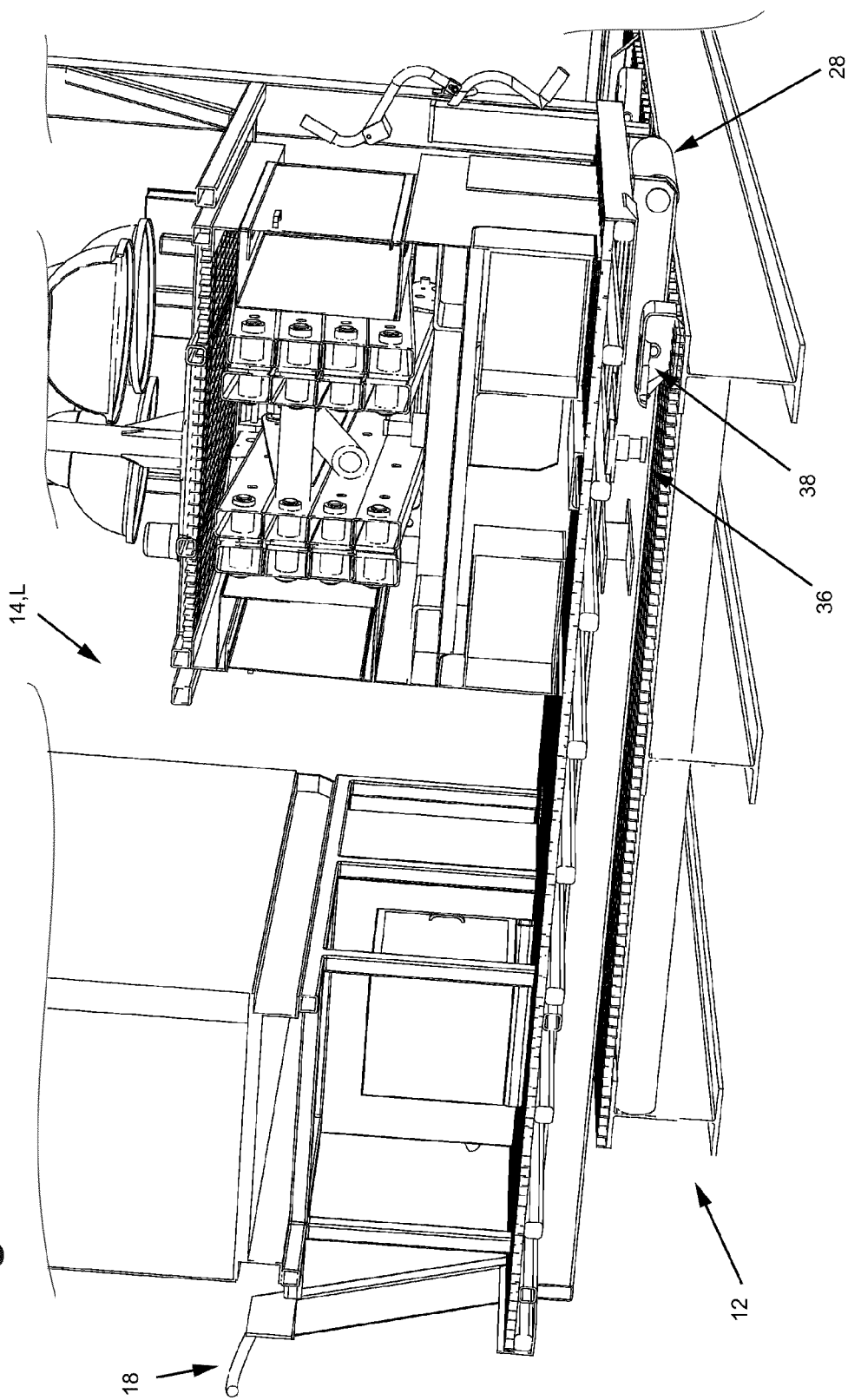

MODULAR COMBINATION SKID

CROSS REFERENCE TO RELATED APPLICATION

This application is a continuation of U.S. application Ser. No. 13/562,321 filed Jul. 31, 2012, which in turn claims the benefit of U.S. Provisional Patent Application Ser. No. 61/660,680 filed Jun. 15, 2012 and entitled, "MODULAR COMBINATION SKID", the entirety of each of which is incorporated herein by reference for all purposes.

FIELD OF THE INVENTION

The invention relates generally to mounting skids for supporting loads, machinery and facilities such as light towers, fuel tanks, first-aid stations, portable washrooms and sewage systems. More specifically, the invention relates to a modular combination skid particularly adapted for transporting equipment used at oilfield wellsite locations.

BACKGROUND OF THE INVENTION

In the oilfield industry, many kinds of machinery and facilities are supported by underlying skids, so as to provide portability and ease of transport to and from an oilfield wellsite lease or site, typically via a flatbed transport trailer or truck. Historically, a principal feature of such skids has been to build a properly sized skid for each type of machinery or facility. For example, Dynawinch Industries Ltd., of Calgary, Alberta, Canada provides a double drum combination skid with control cabin and diesel power pack that is supported by a single skid measuring 5.3 m (210 in) L×2.4 m (94 in) W. As another example, Lee Specialties Ltd. of Red Deer, Alberta, Canada provide a three-piece e-line/combination skid which is comprised of a three separate skids, namely a power skid (supporting a ten kilowatt generator), a control skid (supporting an operators cabin and hydraulic system drum drive) and a drum skid (supporting a drum spooling system), wherein each of these separate skids are sized according to the machinery or facility they support, each therefore have different dimensions from the other.

Typically a large picker truck or crane is used to place this skid-mounted machinery or facility onto, or off of, a flat-bed transport trailer or truck. Alternatively a forklift or a winch tractor may be used to load and off-load of such skid-mounted loads, without the use of cranes. Suitable skilled operators, especially crane operators if cranes are utilized, will also be required to load and off-load such skid-mounted loads. During times of economic boom, as often experienced in the oilfield industry, there are often labor shortages for such skilled operators, which then can impact on the transportation of such skid-mounted loads.

Despite the increase in portability offered by the use of skids, the fact that there is generally no uniform or standardized sizing of these skids results in inefficiencies. For example, smaller skid-mounted loads may be handled with a forklift, but then when larger loads are brought, a picker truck will also be required to load or off-load. Moreover, suitable load and off-load equipment (such as forklifts, picker truck and cranes) will usually be needed at both the oilfield wellsite location (where the skid-mounted equipment is needed and utilized) and at the warehouse, shop or storage site (where the skid-mounted equipment is store, repaired and maintained); or such equipment will be needed to also be transported between these locations along with the skid-mounted loads. This adds to the cost associated with transporting skid-mounted loads to and from various oilfield wellsites.

A further problem with conventional skid-mounted loads is that chains and boomers (a link and lever mechanism which is used to tighten a chain) are normally used to secure such a skid-mounted load on a truck or trailer during transport. The securing and unsecuring of such chains add to the workload associated with transporting skid-mounted loads to and from oilfield locations. Moreover, this securing and unsecuring of chains and boomers present safety concerns to the person doing such securing and unsecuring.

What is needed is a transport system which is simple in design and does not have the above-mentioned disadvantages.

BRIEF DESCRIPTION OF THE DRAWINGS

Referring to the drawings, several aspects of the present invention are illustrated by way of example, and not by way of limitation, in detail in the figures, wherein:

FIGS. 2a-2c are perspective views of the embodiment of FIG. 1a, showing a preferred sequence for loading/unloading a skid-supported load onto the supporting base;

FIGS. 3a-3c are perspective views of the supporting base of the embodiment of FIG. 1a;

FIGS. 4a and 4b are top and bottom perspective views of the skid of the embodiment of FIG. 1a;

FIGS. 5a-5f are perspective views of the embodiment of FIG. 1a, showing a preferred sequence for loading/unloading a skid-supported load onto the supporting base, with FIGS. 5e and 5f being sectioned perspective views;

DETAILED DESCRIPTION OF THE PREFERRED EMBODIMENTS

Figure 1A:
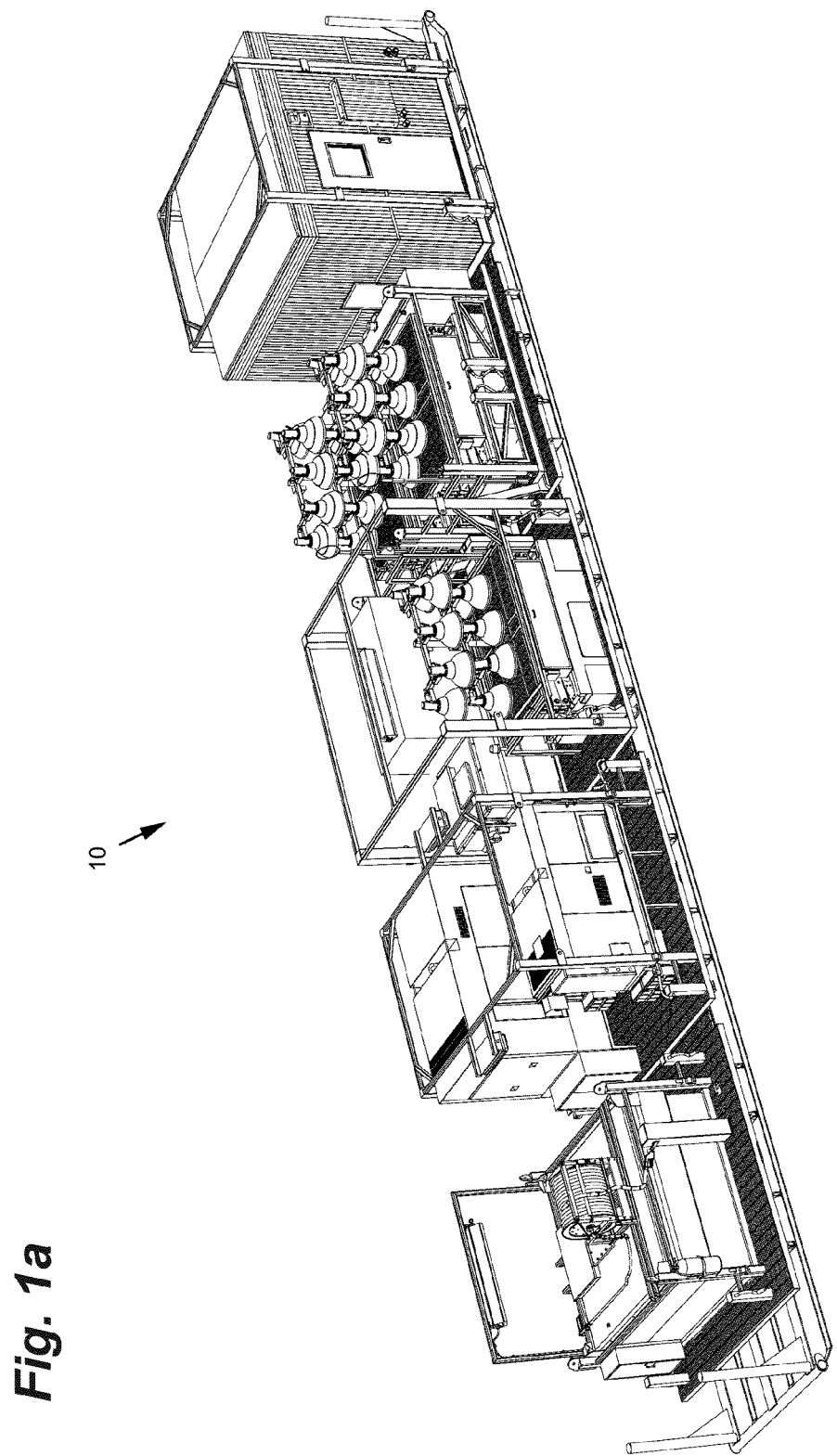
FIGS. 1a and 1b are perspective views of an embodiment of the invention.
Figure 1B:
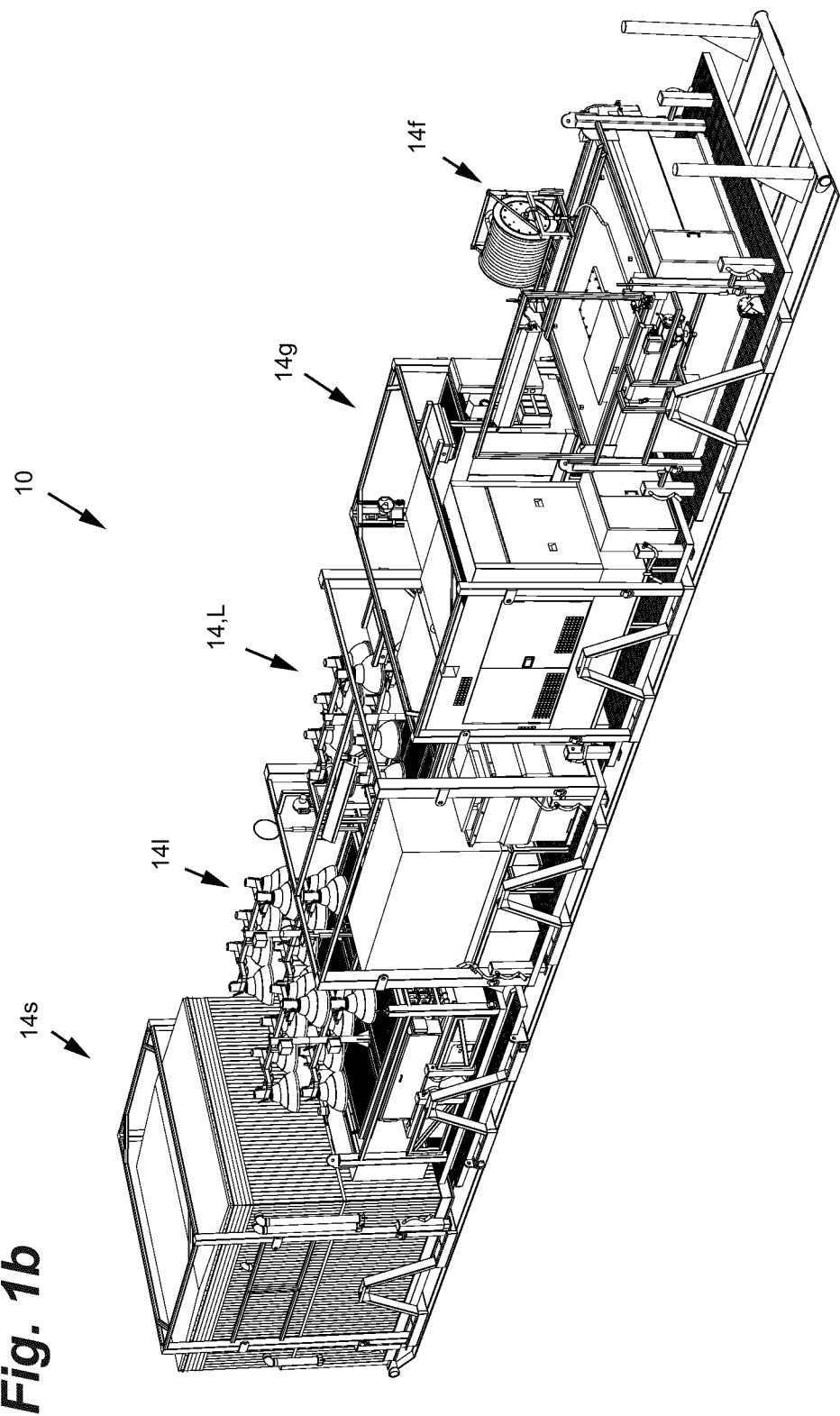
Figure 2A:
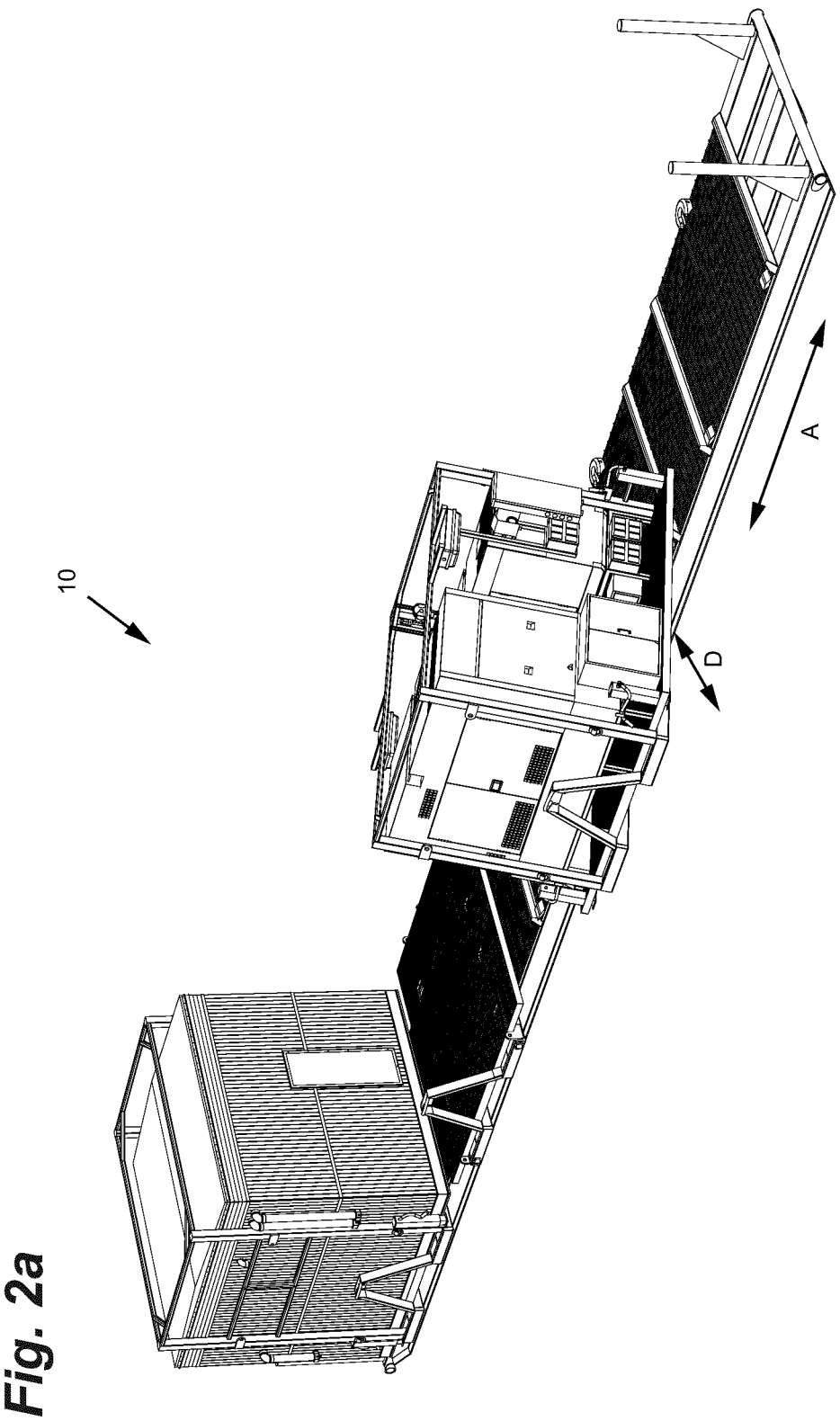
Figure 2C:
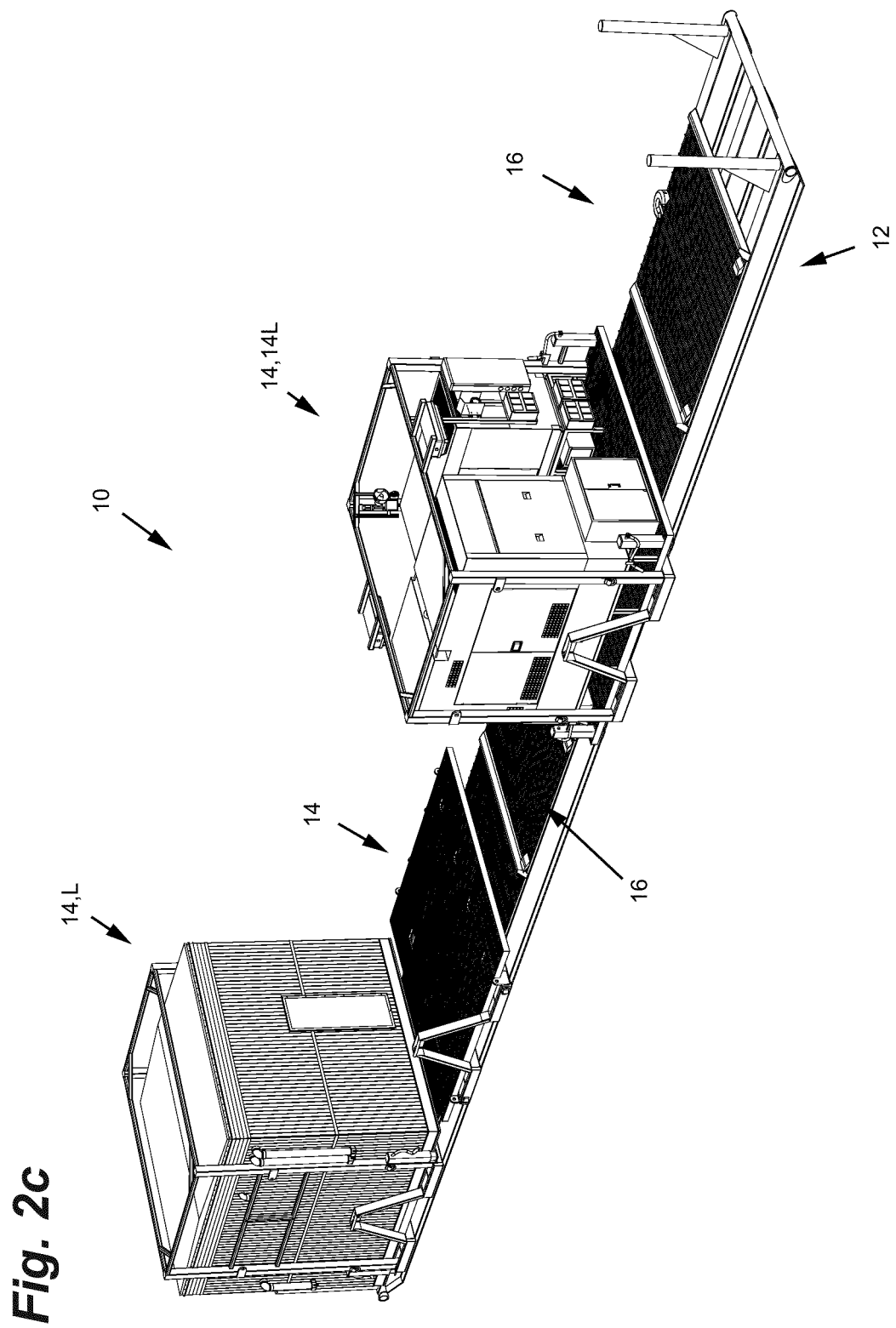
Figure 3A:
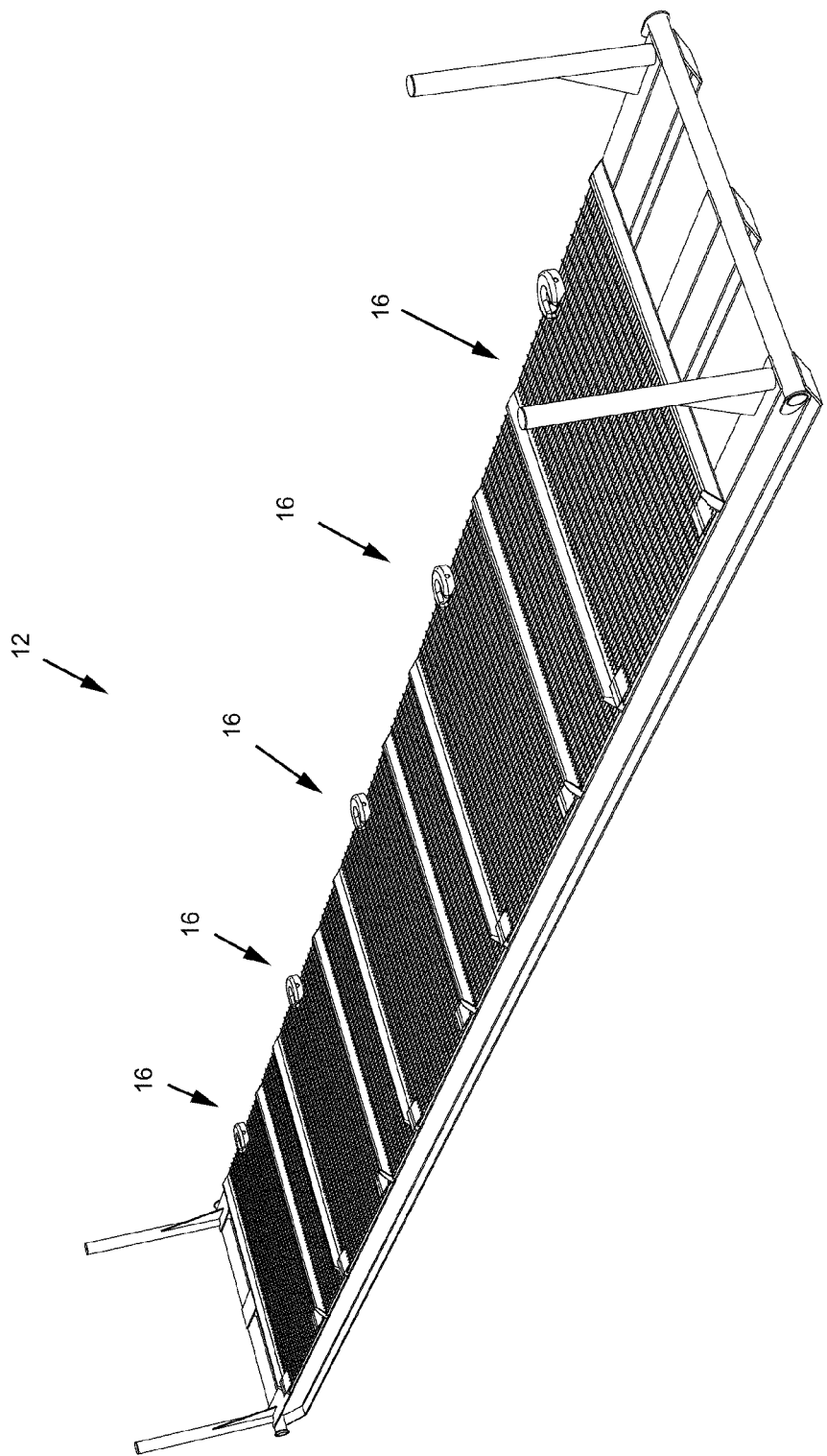
Figure 3B:
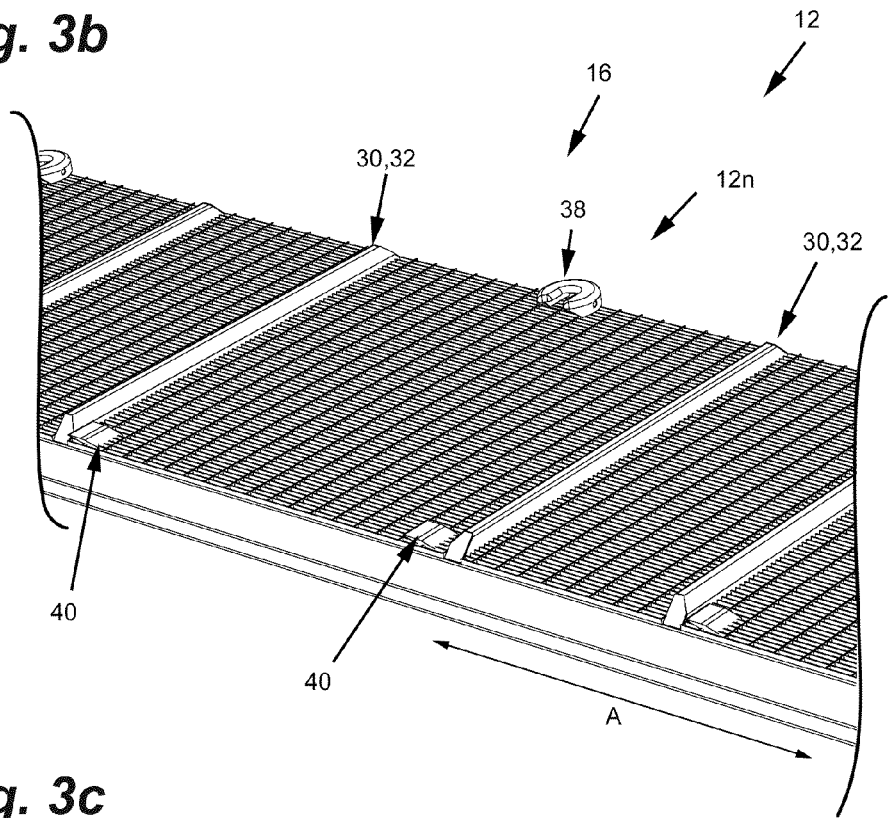
Figure 3C:
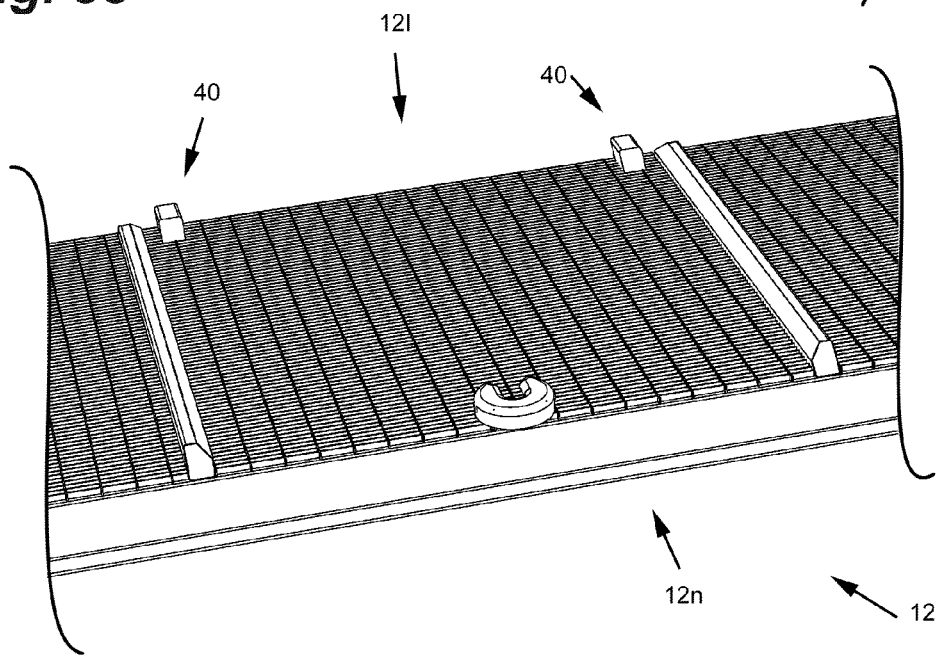
Figure 4A:
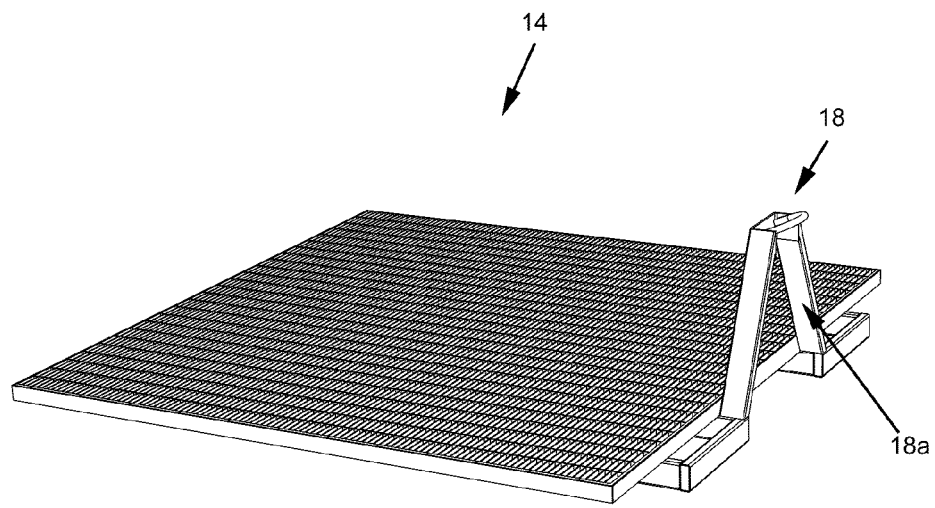
Figure 4B:
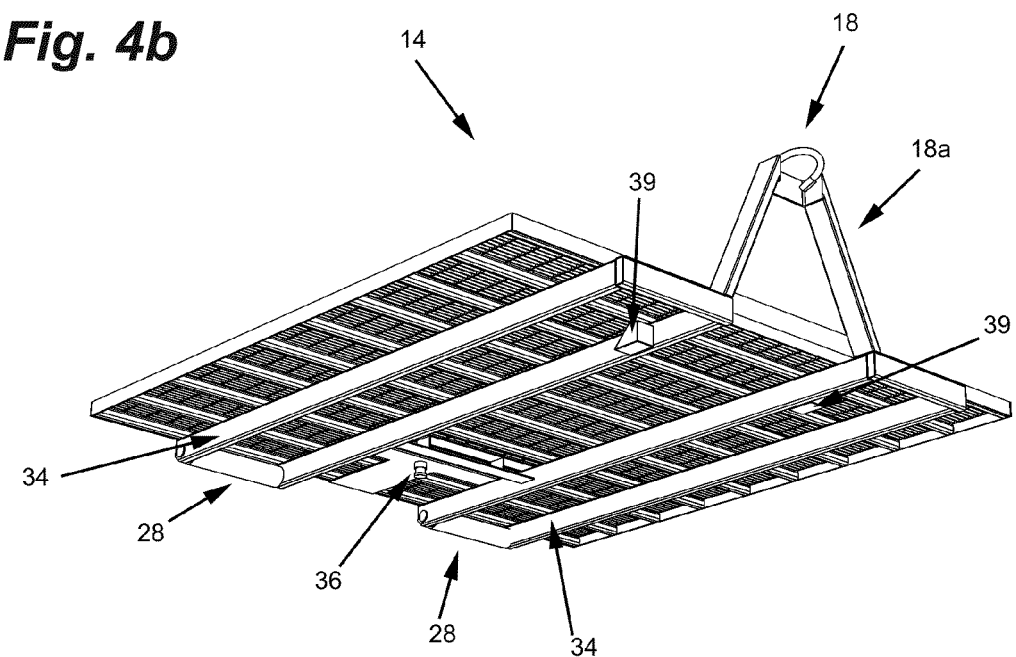
Figure 5A:
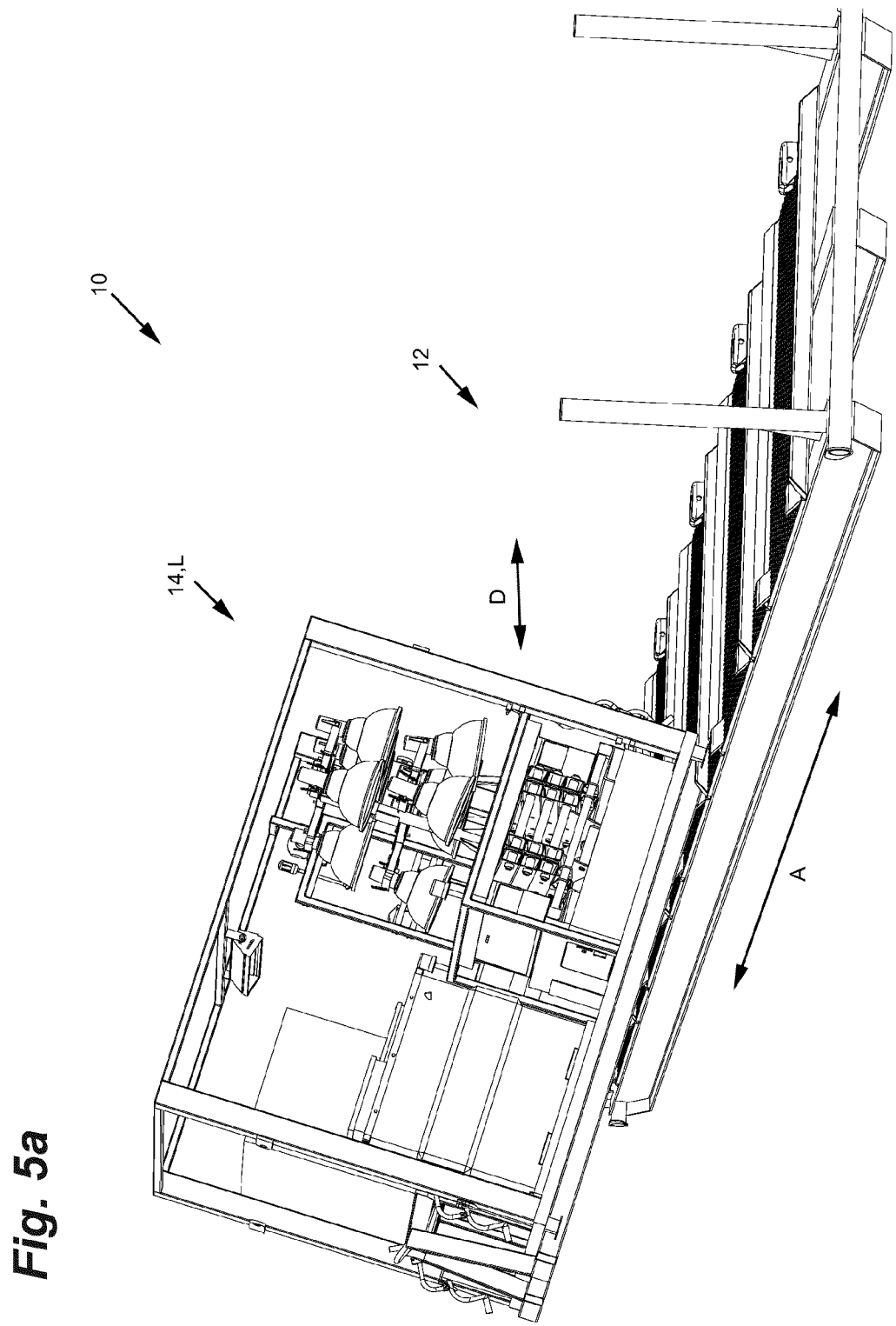
Figure 5B:
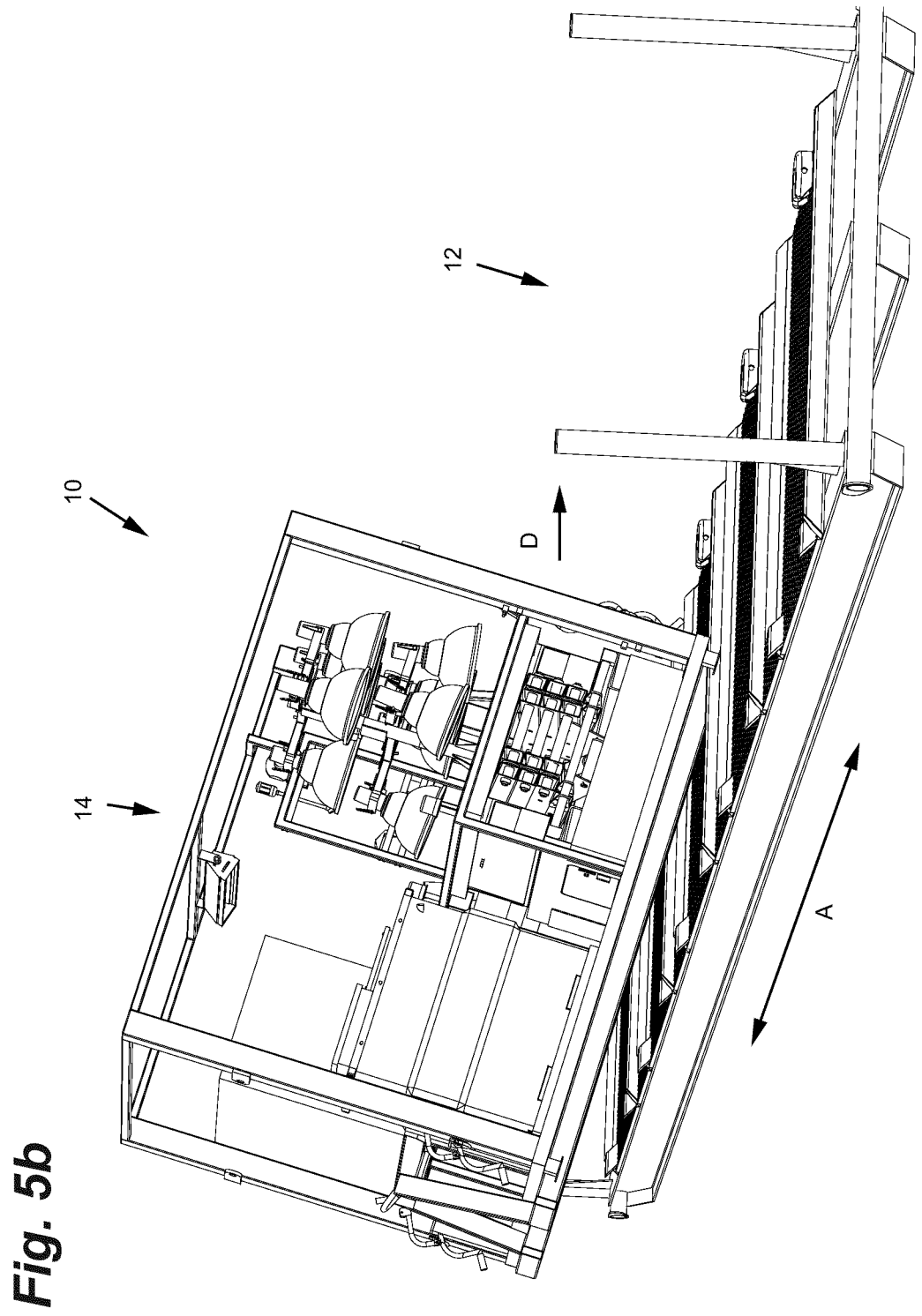
Figure 5C:
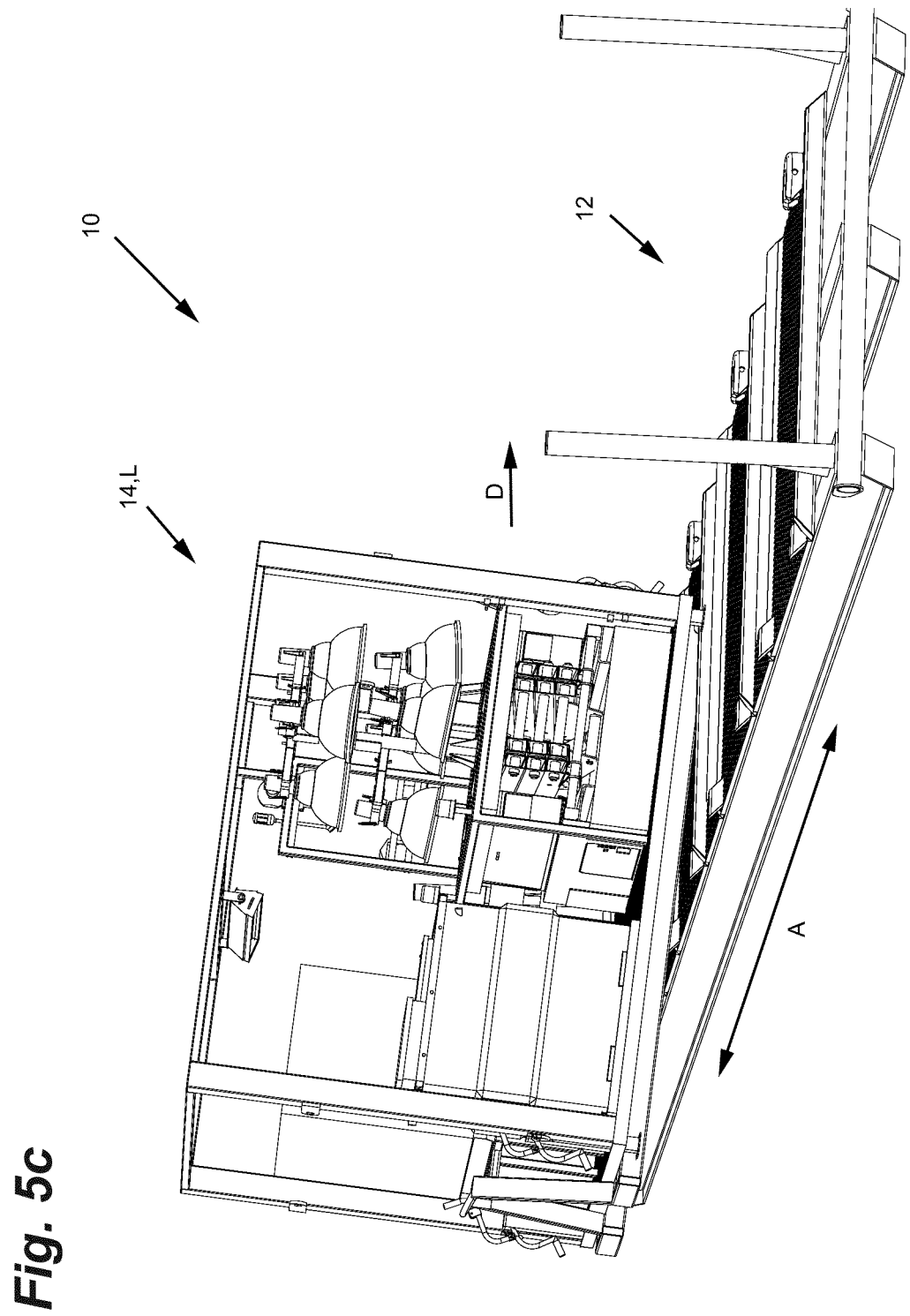
Figure 5D:
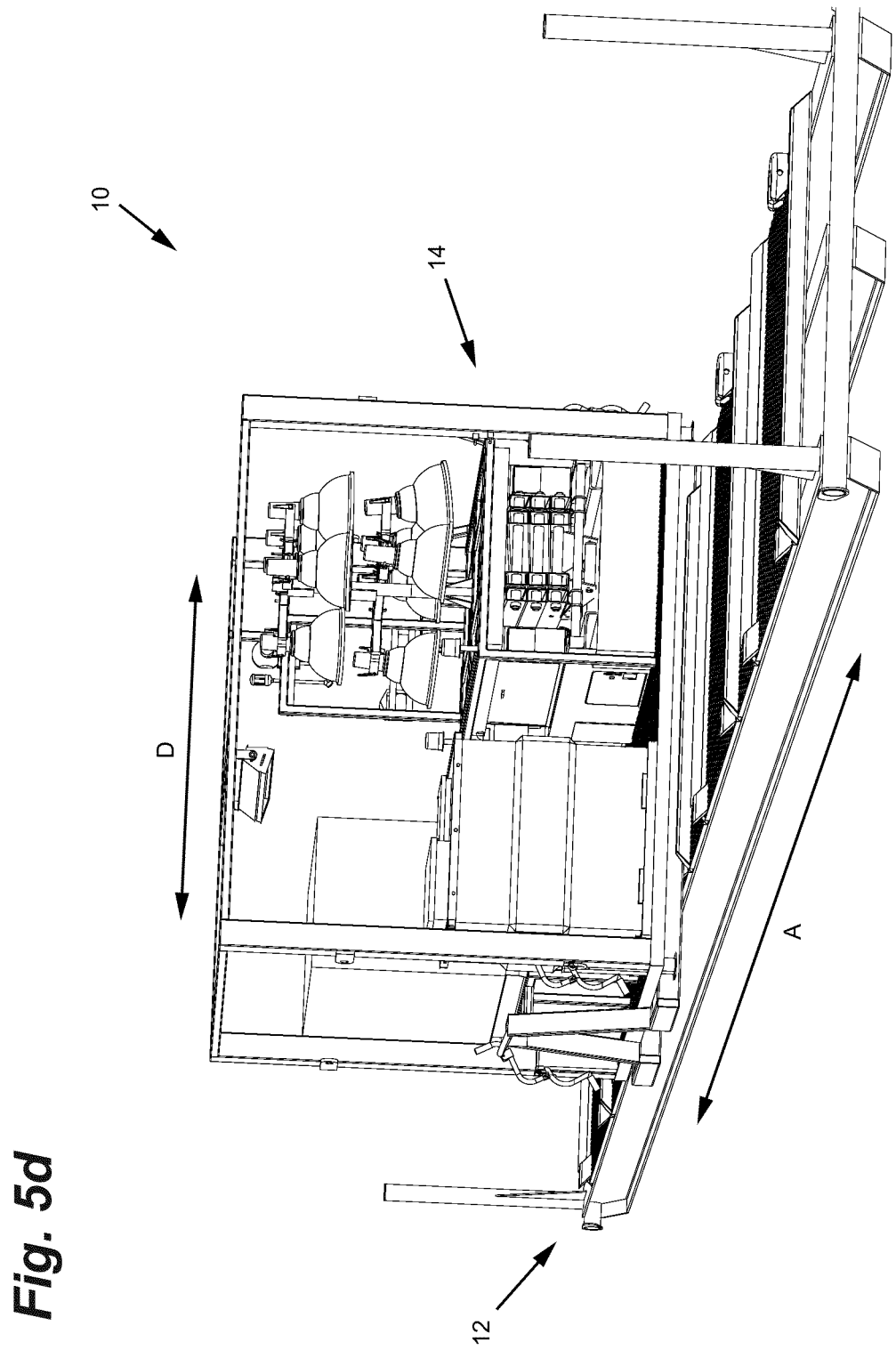
Figure 5F:
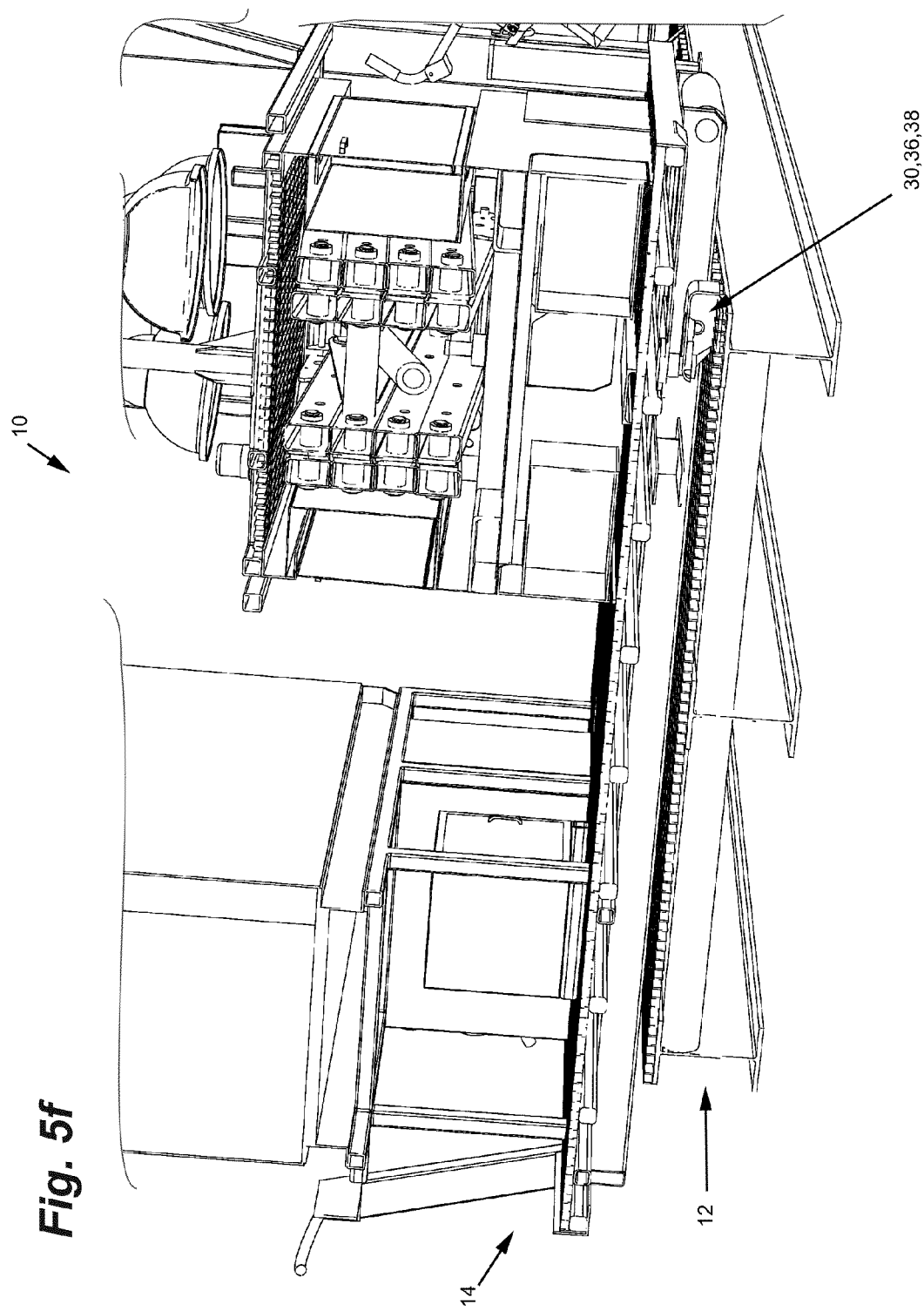
Figure 6A:
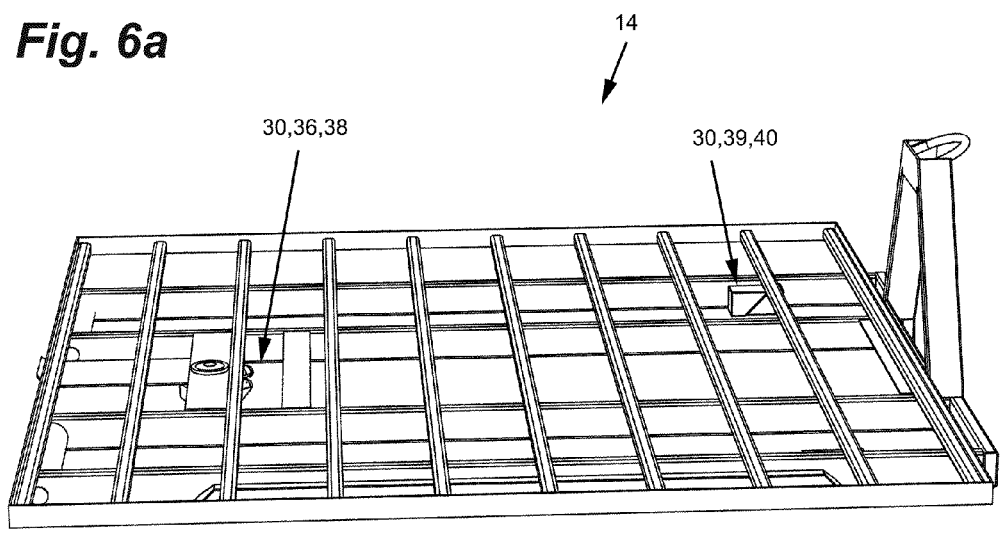
FIGS. 6a and 6b are perspective views of certain of the components of the embodiment of FIG. 1a, shown in a locked arrangement.
Figure 6B:
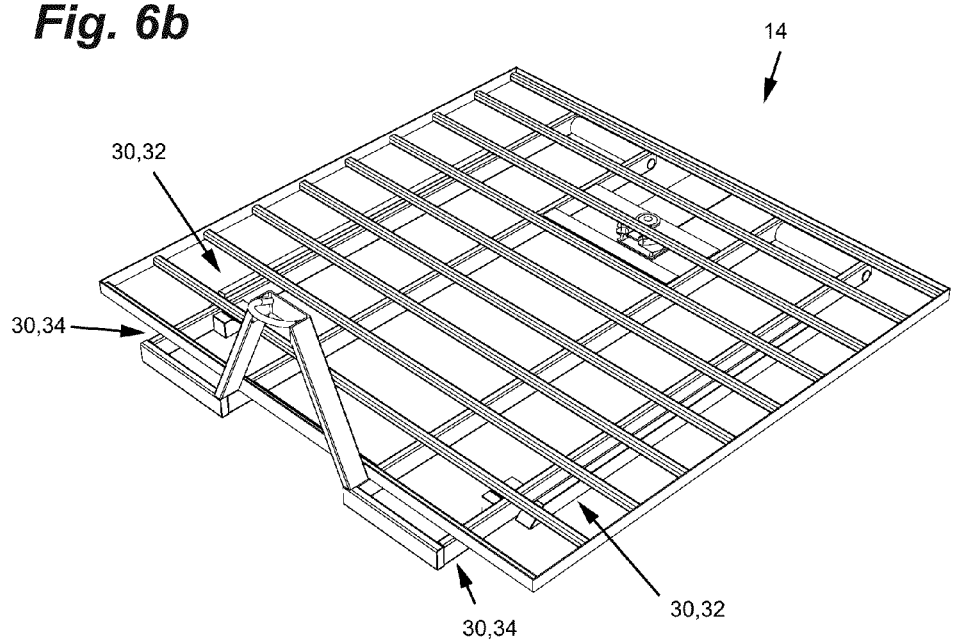
Figure 7A:
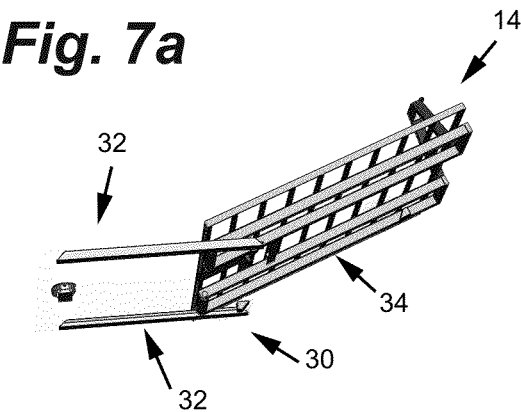
FIGS. 7a-7f are perspective views of certain of the components of the embodiment of FIG. 1a, showing a partial loading/unloading sequence of angled positions of the skid relative to the guide rails of the skid restraining means.
Figure 7B:
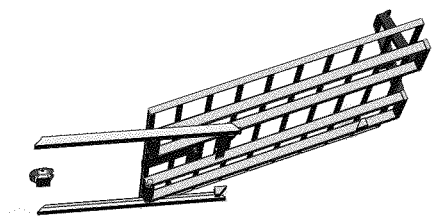
Figure 7C:
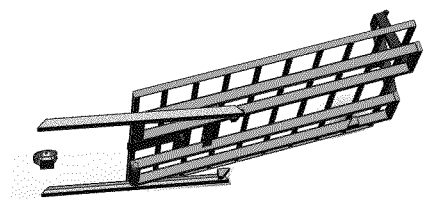
Figure 7D:
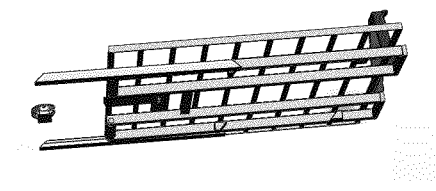
Figure 7E:
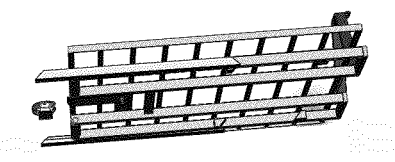
Figure 7F:
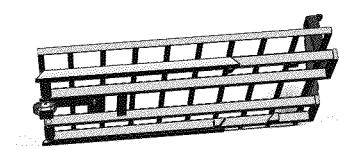
Figure 8A:
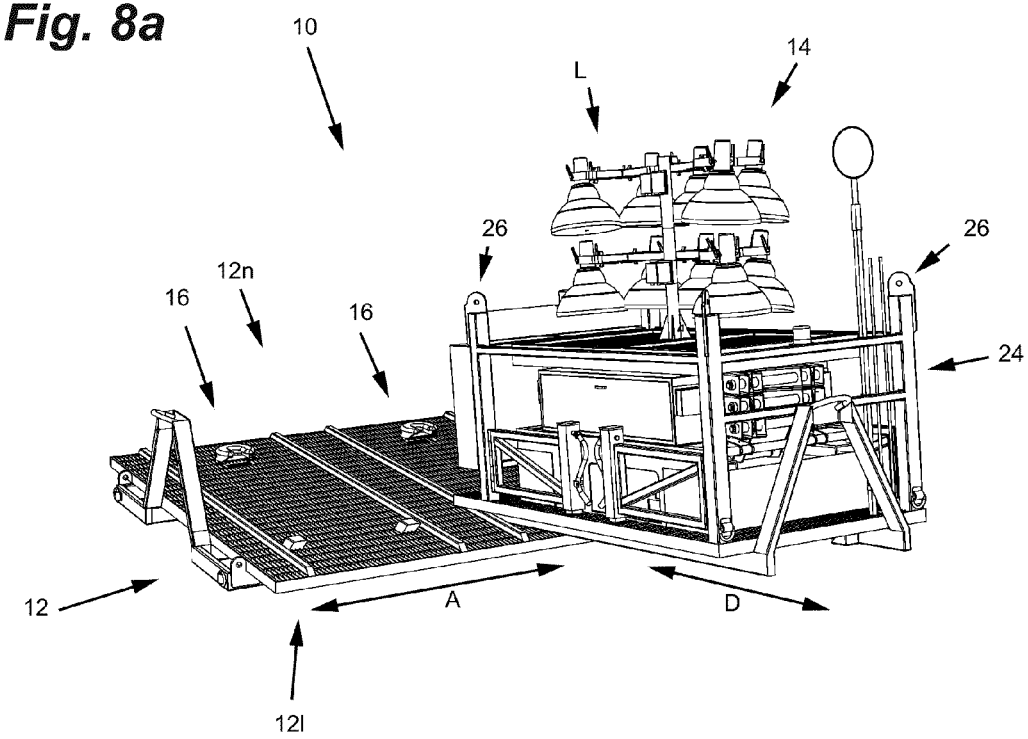
FIGS. 8a-8d are perspective views of another embodiment of the invention (wherein the supporting base is in substantially the form of the skid of the embodiment of FIGS. 1a-7f, supporting two (smaller) skids and wherein the supporting base of this embodiment can be positioned onto a base of the embodiment of FIG. 1a, also showing a preferred sequence for loading/unloading the skid-supported load onto the supporting base.
Figure 8B:
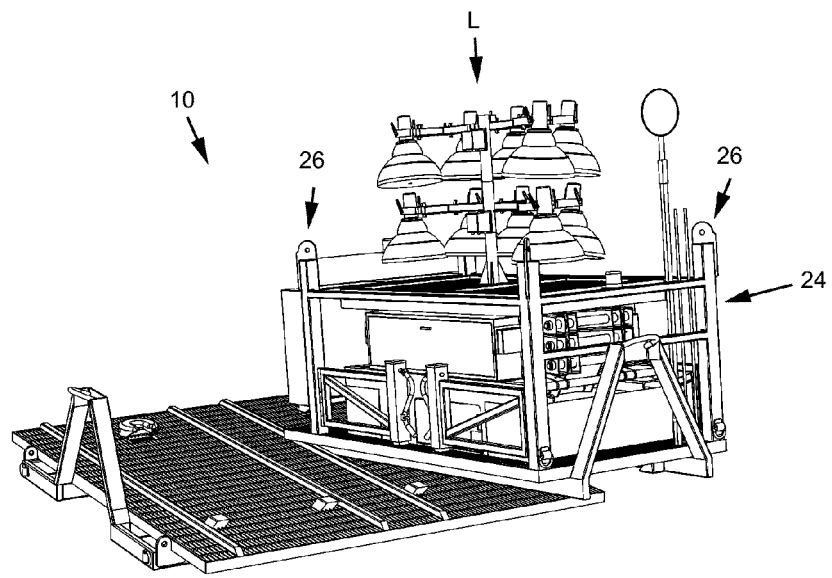
Figure 8C:
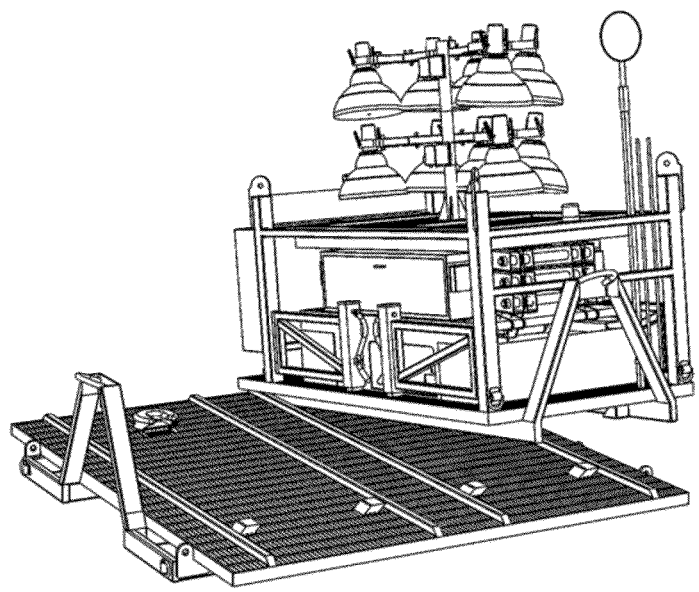
Figure 8D:
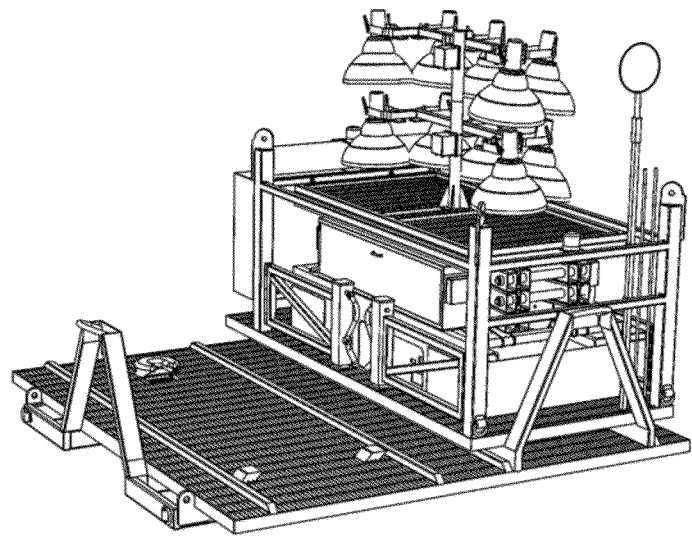
Figure 9A:
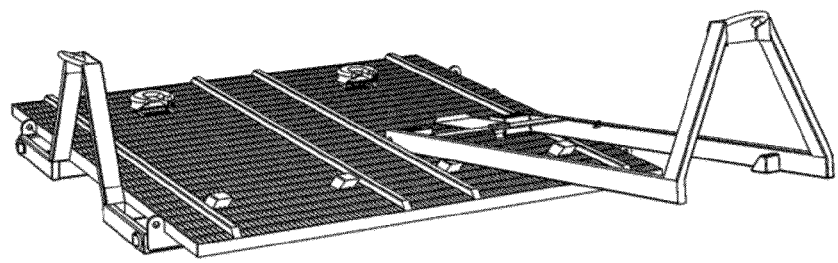
FIGS. 9a-10d are perspective views of certain of the components of the embodiment of FIG. 8a, showing a partial loading/unloading sequence of angled positions of the skid relative to the skid restraining means.
Figure 9B:
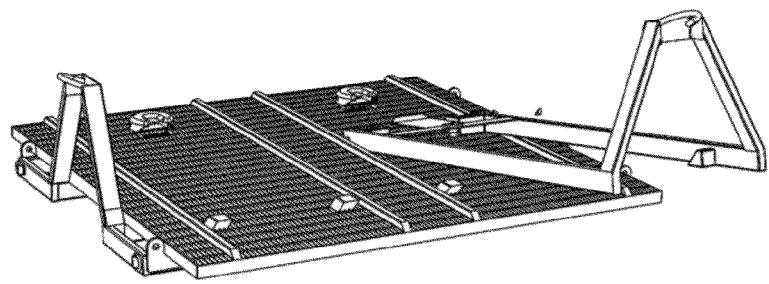
Figure 9C:
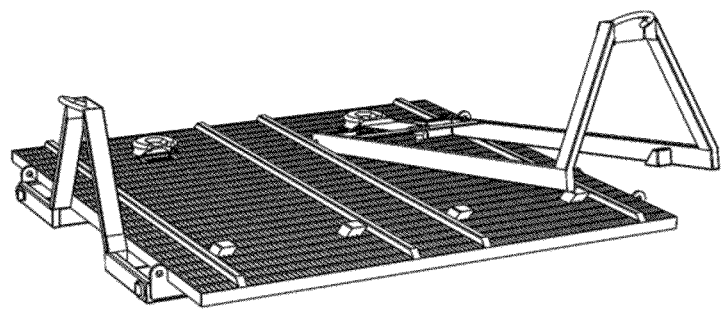
Figure 9D:
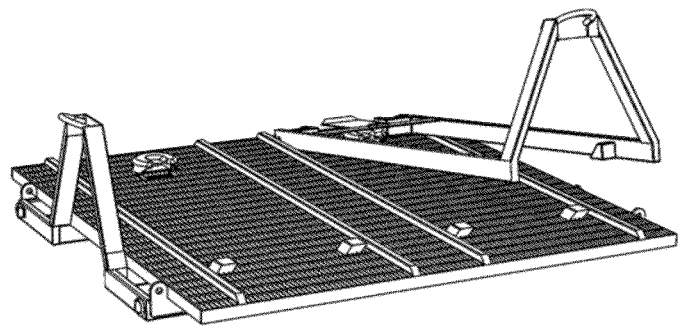
Figure 10A:
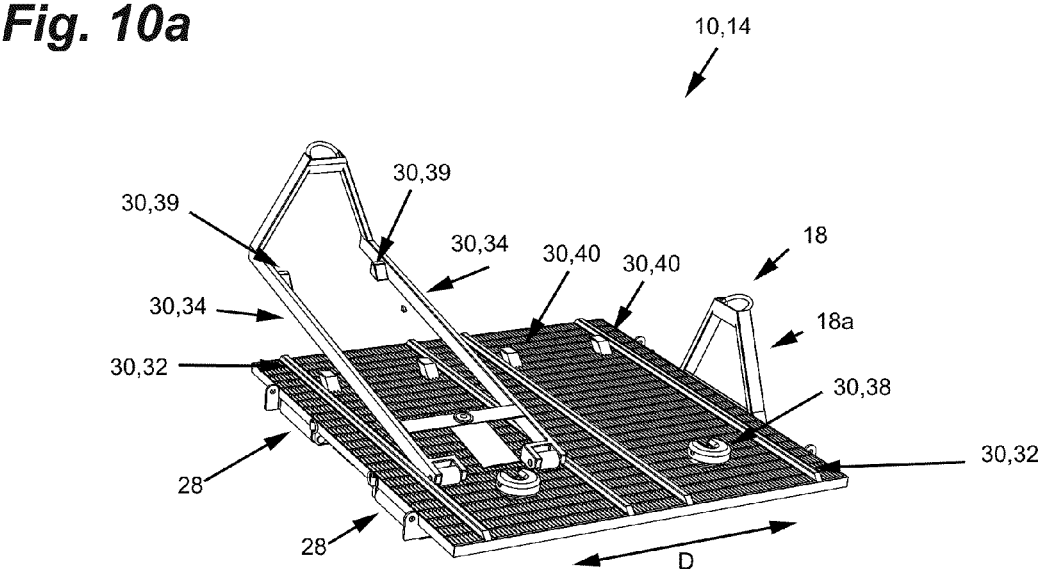
Figure 10B:
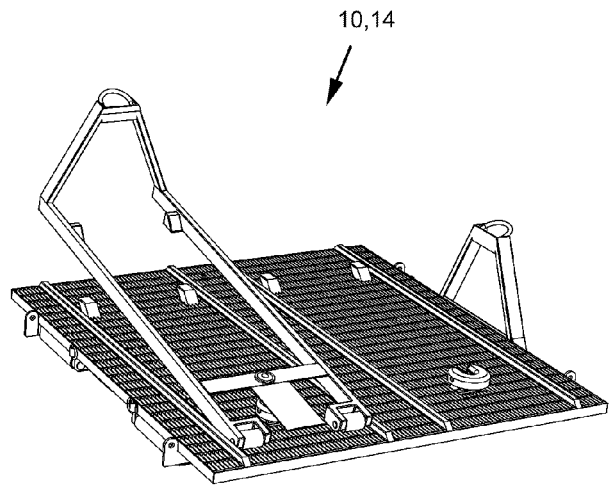
Figure 10C:
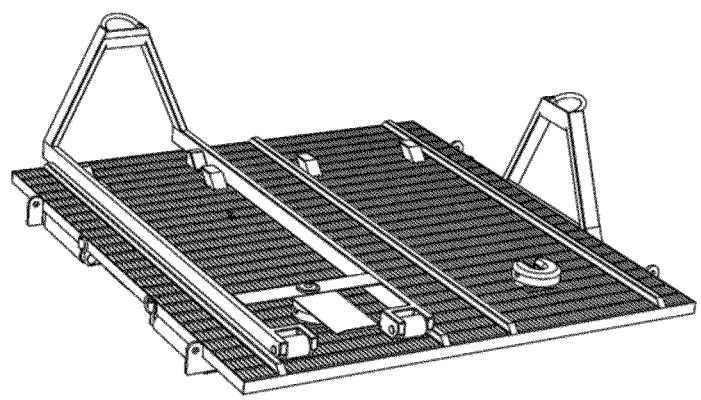
Figure 10D:
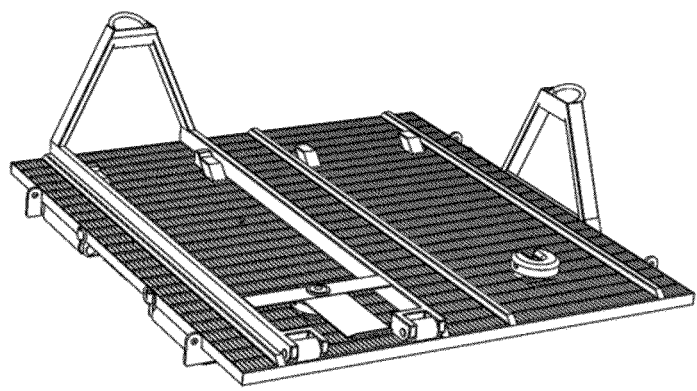

The following description is of a preferred embodiment by way of example only and without limitation to the combination of features necessary for carrying the invention into effect. Reference is to be had to the Figures in which identical reference numbers identify similar components. The drawing figures are not necessarily to scale and certain features are shown in schematic or diagrammatic form in the interest of clarity and conciseness.

Referring now in detail to the accompanying drawings, there is illustrated exemplary embodiments of the present invention, generally referred to by the numeral 10.

A supporting base 12 is adapted to support and transport a plurality of skids 14, the skids 14 each supporting various loads L as may be desired (collectively referred to as skid-supported loads), such as light towers 14*l*, fuel tanks 14*f*, first-aid stations, portable washrooms, electricity generators 14*g* and sewage treatment buildings 14*s*. The base 12 has a longitudinal axis A and provides a plurality of docking stations 16 for the skids 14 or the skid-supported loads L. Preferably, the plurality of docking stations 16 are provided in a serial, or in-line, manner along said axis A. For example, the embodiments of the invention 10 shown in FIGS. 1*a*-7*f* provides five docking stations 16 indicated by the numerals 16*a* to 16*e*; the embodiment of the invention 10 shown in FIGS. 8*a*-10*d* provides two docking stations 16, indicated by the numerals 16*a* and 16*b*; and the embodiment of the invention 10 shown in FIGS. 11*a*-11*e* provides three docking stations 16, indicated by the numerals 16*a* to 16*c*. However, other combinations or orientations of the plurality of docking stations 16 are also possible.

Although supporting base 12 is shown in a stationary embodiment in FIGS. 1*a*-10*d*, a person of skill in the art would understand that base 12 may also be of the mobile variety, such as being placed on a transportable trailer or being provided with suitable wheels and tow hitch means 12*h*, such as shown in the embodiment of FIGS. 11*a*-11*e*. Preferably, the various components of the invention 10, such as the base 12 and skids 14, are made of steel or any other suitable material that provides adequate strength, durability and rigidity to support the various loads L, including during transport. More preferably, the dimensions of the skids 14 are as large as possible to be transported on a highway (on base 12) without the requirement of special permits. Even more preferably, all the components of the present invention 10, including the skids 14, are sized to take maximum advantage of these regulated transportation dimensions.

Preferably, the skids 14 and the docking stations 16, of a particular embodiment of the invention 10, are all of substantially the same dimensions. That is, in a preferred embodiment, the skids 14 are all alike and the docking stations 16 are all alike, with each of the substantially identical docking stations 16 capable of receiving each of the substantially identical individual skids 14 which might comprise the plurality of skids 14. Together, the skids 14 and docking stations 16 thereby being of a modular design, wherein one skid 14 having a particular load L (e.g. a light tower 14*l*) can be placed and secured (loaded/unloaded) in any available docking station 16 (e.g., for the embodiment of FIG. 1*a* into, or out of, any of docking stations 16*a* through 16*e*). In a preferred embodiment, skid 14 has a length and width of 11 feet. In another embodiment, the length and width of the skid 14 is 10 feet by 10 feet.

Figure 11A:
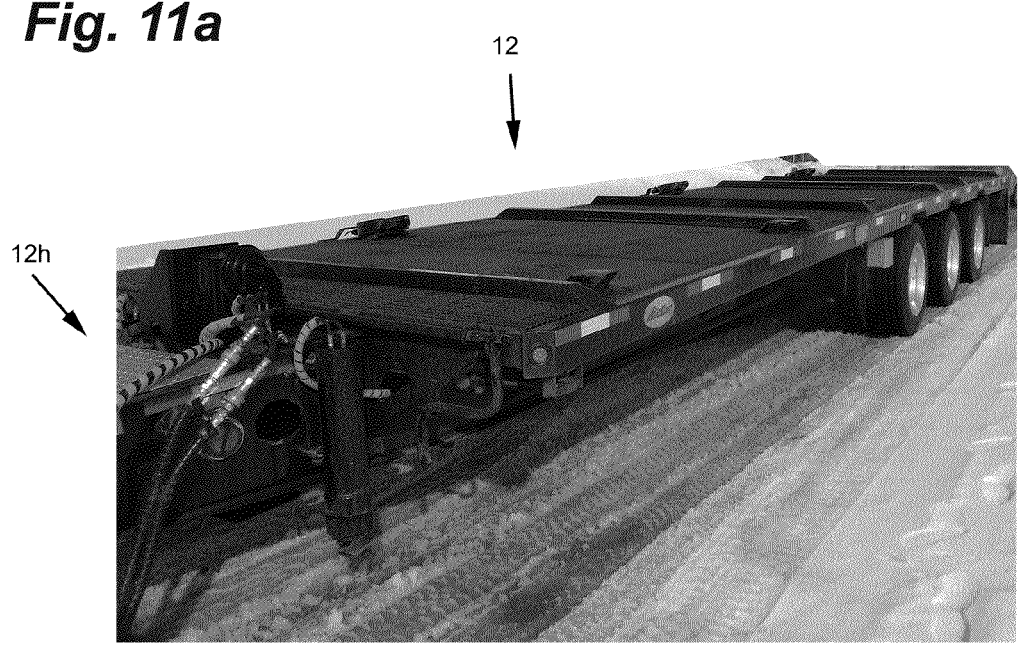
FIGS. 11a-11d are perspective views of yet another embodiment of the invention, showing a skid-supported load being unloaded from the supporting base using a hook-truck.
Figure 11B:
Figure 11C:
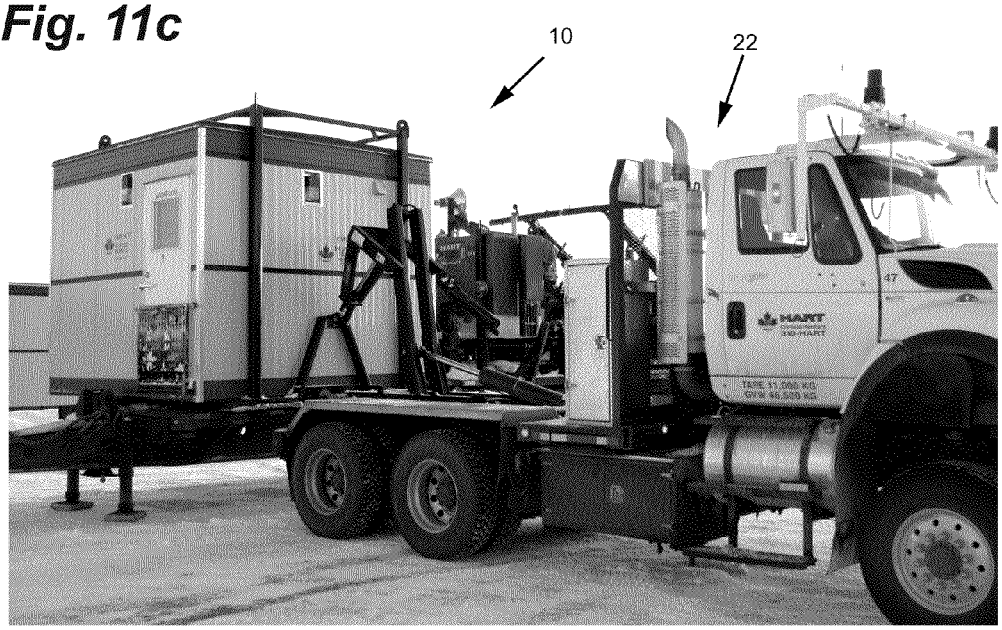
Figure 11D:
Figure 11E:
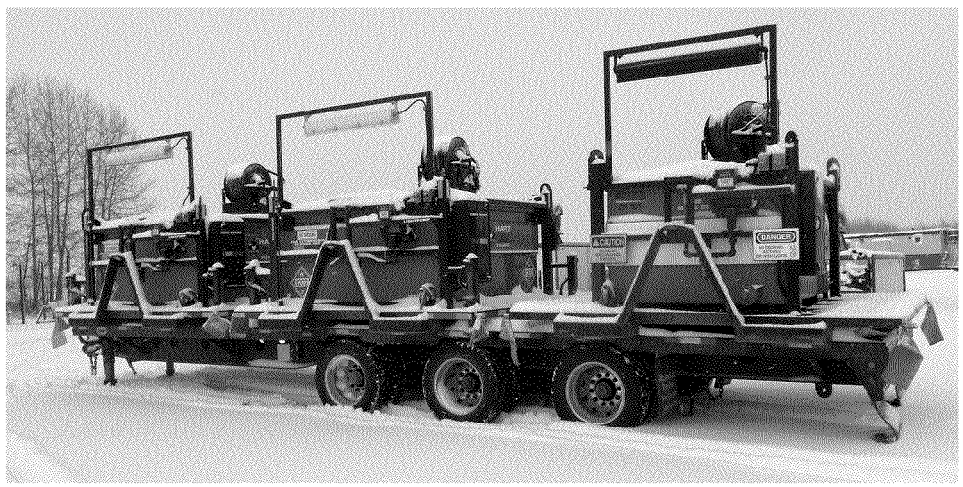
FIG. 11e is a perspective view of the embodiment of FIG. 11a, showing three skid-supported loads loaded onto the supporting base.

As mentioned, in a preferred embodiment, each skid 14 is substantially identical and each skid 14, preferably, comprises a hook receiving member or hook loop 18 for securely receiving a hook 20 from a hook truck or hook-lift hoist 22 in a hooking position, for engagement therewith and so as to allow the skid 14 to be loaded or unloaded from a docking station 16 by the hook truck 22 in a conventional manner (as more clearly illustrated in FIGS. 11*b*-11*d*). The hook receiving member 18 may be mounted to the skid 14 at a desirable height via a conventional A-frame member 18*a*. More preferably, the hook truck 22 is a 6-wheel drive truck (to provide additional traction to move around an oilfield lease) and further comprises suitable hitch means 22*h* so as to securely tow the supporting base 12 to different locations; see, for example, the hook truck 22 and supporting base 12 as shown in the embodiment of FIGS. 11*a*-11*e*. Advantageously, hook truck 22 can be utilized to both tow the support base 12 to and from a desired oilfield wellsite lease location and to load and unload skids 14 and loads L on to and off of the docking stations 16. By utilizing a single vehicle such as hook truck 22 to accomplish both tasks, there will be a reduced need for additional equipment, such as forklifts and cranes and additional skilled operators, such as crane operators.

Preferably, each skid 14 further comprises frame structure 24, which surrounds all or a portion of a particular load L that may be on the skid 14, such as in a frame or cage-like manner, thereby providing additional protection to the load L, such as during transportation (such as from tree branches that may impact load L), during maneuvering of the skid 14 (and load L) on or off the docking station 16 or during maneuvering of the skid 14 (and load L) in different positions around an oilfield wellsite lease or a warehouse site. More preferably, the frame structure 24 further comprises lifting points or lifting lug 26 to allow the skid 14 and load L to be moved around to various desired locations on an oilfield lease, such as by a 30 ton picker that may be at such oilfield lease. Lifting lugs 26 may be placed, as desirable, near the top of frame structure or part way up the frame structure's height.

Preferably, each skid 14 further comprises one or more rollers 28 to fasciliate the loading and unloading of a skid 14 into or out of a docking station 16 (or onto or off of a hook truck 22). Advantageously, rollers 28 can roller on the upper surface of supporting base 12 when the skid 14 is being docked into or out of a docking station 16. See, for example, FIGS. 10*a*-10*d*. More preferably, the rollers 28 are provided at an end of the skid 14 that is opposite to the hook receiving member 18, the rollers 28 and hook receiving member 18 then defining a loading directional axis D of the skid 14.

In a preferred embodiment, the plurality of docking stations 16 are provided in a serial, or in-line, manner along said axis A and further comprise skid restraining or securing means 30 to securely lock skids 14 to the base 12 and prevent skids 14 from moving along axis A when skids 14 are placed in a loaded position, such as during transport of the invention 10. Skid restraining means 30 preferably comprises paired guide rails 32 that mate with corresponding rails 34 underneath the skids 14 (see, for example, FIGS. 6*a*-7*f*). Preferably, guide rails 32 are oriented substantially perpendicular to the longitudinal axis A of the base 12 and, hence, substantially parallel to the loading directional axis D. More preferably, skid restraining means 30 further comprises a ball 36 (projecting from the underside of skid 14) and a fifth-wheel receiver hitch 38 (projecting up from base 12) which mate and lock together when the skid 14 is placed in the loaded position on the base 12. Advantageously, ball 36 and hitch 38, further retaining and securely fasten skid 14 to base 12 when skid is in the loaded position (see FIGS. 6*a* and 6*b*). Even more preferably, skid restraining means 30 further comprises wedge members 39, 40 projecting from skid 14 and base 12 respectively at an end (on skid 14 and base 12) that is substantially opposite to the end where the ball 36 and hitch 38 are positioned. Advantageously, wedge members 39, 40 cooperate and mate to further restrain and securely fasten skid 14 to base 12 when in a loaded position. Even more advantageously, ball 36, hitch 38 and wedges 39, 40 provide vertical restraining means to the skids 14, when in a loaded position, so that the skids 14 do not lift or bounce off of the base 12 if it is bumped during transport. Yet even more advantageously, skid restraining means 30 reduce or eliminate the need for traditional chains and boomers to secure a skid 14 or load L onto a base 12.

More advantageously, skid 14 can be easily moved onto or off of base 12 (to and from the loaded position) by using a hook truck 22 in a conventional manner and angling and moving the skid 14 (with rollers 28 rolling on base 12) as more clearly shown in FIGS. 2a-2c, 5a-5f, 8a-10d and 11b-11d.

As such, in a preferred embodiment, the modular skids 14 are loaded and unloaded, in a conventional manner using a hook truck 22, into the docking stations 16 with their loading directional axis D being oriented substantially perpendicular to the longitudinal axis A of the base 12. See, for example, FIGS. 2a-2c, 5a-5f, 8a-10d and 11b-11d. More preferably, each of the hitch 38 and wedge member 40 are provided on the same (respective) sides of the base 12; see 3a-3c. Advantageously, all of the modular skids 14 can be loaded and unloaded into the modular docking stations 16 from the same side of the base 12, thereby reducing the need for a hook truck or the like to move back-and-forth from one side of the base 12 to the other when manipulating skids 14 on or off the base 12. Such a side can be referred to as the base's loading side 12l and the other side can then be referred to as a non-loading side 12n. More advantageously, the base 12 can be positioned with its non-loading side 12n adjacent a wall, cliff or other obstacle, while still allowing for easy access to the docking stations 16 from the loading side 12l. However, the invention 10 should not be understood to be limited by having only a single loading side. In alternate embodiments (not-shown), the docking stations 16 could, for instance, alternate with each of their respective loading sides being positioned on one side of the base 12 or the opposite side of the base 12.

As mentioned, the loading and unloading of the skids 14 into or out of the docking stations 16 can be done by using a hook truck 22 in a conventional manner, as shown in the Figures and with the unloading sequence being generally the reverse of the loading sequence. Advantageously, all loading, unloading and set up of the skids 14 and loads L can be done through one hook truck 22 often only requiring just a driver and swamper. This significantly reduces traditional labour costs associated with setting up various facilities, such as light towers, fuel tanks, first-aid stations, portable washrooms and sewage systems, on oilfield wellsite leases. More advantageously, the modular nature of the skids 14 and docking stations 16 allow for quick and efficient transportation of such equipment and facilities, by providing for ease of combination or recombination of various modules 14l, 14f, 14g, 14s onto a base 12 (e.g. in one case, two light towers 14s and a generator 14g can be put on a base 12 and be transported to a wellsite requiring such equipment, while a fuel tank 14f and portable washroom are also placed on that base 12 to be transported to a second wellsite requiring that equipment and being only a short distance away from the first wellsite).

Those of ordinary skill in the art will appreciate that various modifications to the invention as described herein will be possible without falling outside the scope of the invention.

The embodiments of the invention in which an exclusive property or privilege is being claimed are defined as follows:

1. A base for supporting a plurality of skid-supported loads, the base having a longitudinal axis, the skid-supported loads each having a skid and at least one first wedge member projecting from said skid, the base comprising:
   a plurality of docking stations, each docking station capable of receiving one of said plurality of skid-supported loads along a loading directional axis;
   skid restraining means, for each of the plurality of docking stations, said skid restraining means comprising:
   at least one second wedge member on the base adapted to mate with at least one first wedge member of one of said plurality of skid-supported loads, when said one skid-supported load is received in one of said plurality of docking stations, so as to restrain said one skid-supported load to said one of said plurality of docking stations, by securely fastening the skid of said one skid-supported load to the base, when said one skid-supported load is in a loaded position;
   wherein each of the loading directional axis of said plurality of docking stations is oriented substantially perpendicular to the longitudinal axis of the base; and
   wherein the at least second wedge member is positioned on the base so as to provide a recess between the base and said second wedge member, said recess suitable to accept a portion of the first at least wedge member, when said one skid-supported load is in the loaded position and said at least one first wedge member and said at least one second wedge member are mated.

2. The base of claim 1 wherein the plurality of docking stations and the skid-supported loads are of a modular design, so that a skid-supported load can be received by any one of the plurality of docking stations.

3. The base of claim 1 wherein the plurality of docking stations are provided serially the longitudinal axis.

4. The base of claim 1 wherein the skid restraining means further comprises a plurality of guide rails on the base that mate with a set of corresponding rails underneath one of said plurality of skid-supported loads, when said one skid-supported load is in the loaded position.

5. The base of claim 4 wherein the guide rails are oriented substantially perpendicular to the longitudinal axis of the base.

6. The base of claim 5 wherein, for each of the plurality of docking stations, the skid restraining means further comprises a hitch to receive a ball projecting from one of said plurality of skid-supported loads when said one skid-supported load is placed in the loaded position.

7. The base of claim 6 wherein the base has a loading side and a non-loading side and wherein the hitch is provided substantially at the non-loading side and wherein the at least one second wedge member is provided substantially at the loading side.

8. The base of claim 7 wherein the one of said plurality of skid-supported load further comprises a hook receiving member.

9. The base of claim 1 wherein the base has a loading side and a non-loading side.

10. The base of claim 1 wherein the base further comprises wheels and tow hitch means.

11. The base of claim 1 wherein one of said plurality of skid-supported loads is one of a light tower, a fuel tank, a first-aid station, a portable washroom, an electricity generator or a sewage treatment building.

12. A base for supporting a plurality of skid-supported loads, the base having a longitudinal axis, the skid-supported loads each having a skid and at least one first wedge member projecting from said skid, the base comprising:
   a plurality of docking stations, each docking station capable of receiving one of said plurality of skid-supported loads along a loading directional axis;

skid restraining means, for each of the plurality of docking stations, said skid restraining means comprising:

at least one second wedge member on the base adapted to mate with at least one first wedge member of one of said plurality of skid-supported loads, when said one skid-supported load is received in one of said plurality of docking stations, so as to substantially vertically restrain said one skid-supported load to said one of said plurality of docking stations, by securely fastening the skid of said one skid-supported load to the base, when said one skid-supported load is in a loaded position;

wherein each of the loading directional axis of said plurality of docking stations is oriented substantially perpendicular to the longitudinal axis of the base.

13. The base of claim 12 wherein the at least second wedge member is positioned on the base so as to provide a recess between the base and said second wedge member, said recess suitable to accept a portion of the first at least wedge member, when said one skid-supported load is in the loaded position;

wherein, when said portion of the first at least wedge member is positioned within said recess, the least one first wedge member and the at least second wedge member are mated so as to substantially vertically restrain said one skid-supported load to said one of said plurality of docking stations.

14. The base of claim 13 wherein the plurality of docking stations are provided serially the longitudinal axis; and wherein the skid restraining means further comprises a plurality of guide rails on the base that mate with a set of corresponding rails underneath one of said plurality of skid-supported loads, when said one skid-supported load is in the loaded position.

15. The base of claim 14 wherein the guide rails are oriented substantially perpendicular to the longitudinal axis of the base.

16. The base of claim 15 wherein, for each of the plurality of docking stations, the skid restraining means further comprises a hitch to receive a ball projecting from one of said plurality of skid-supported loads when said one skid-supported load is placed in the loaded position.

17. The base of claim 16 wherein the base has a loading side and a non-loading side and wherein the hitch is provided substantially at the non-loading side and wherein the at least one second wedge member is provided substantially at the loading side.

18. The base of claim 17 wherein the one of said plurality of skid-supported load further comprises a hook receiving member.

19. The base of claim 13 wherein the base has a loading side and a non-loading side.

20. The base of claim 13 wherein the base further comprises wheels and tow hitch means.

* * * * *